United States Patent Office 3,146,665
Patented Sept. 1, 1964

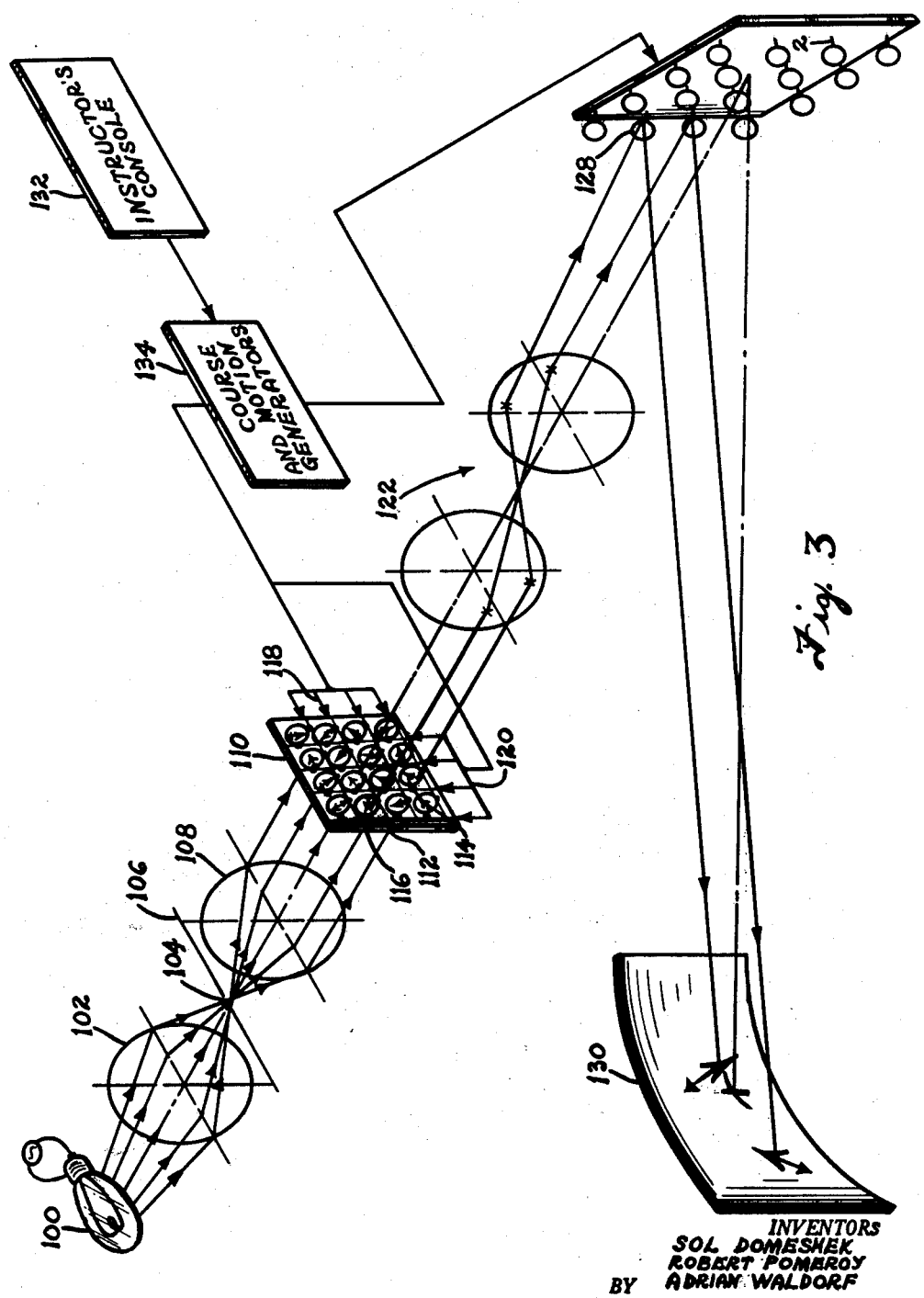

3,146,665
MULTIPLE MOVING BEAM PROJECTOR
Sol Domeshek, 160 S. Middle Neck Road, Great Neck, N.Y., and Robert R. Pomeroy, 53 Sintsink Drive E., and Adrian Waldorf, 100 Harbor Hills Drive, both of Port Washington, N.Y.
Filed June 21, 1961, Ser. No. 125,897
5 Claims. (Cl. 88—24)
(Granted under Title 35, U.S. Code (1952), sec. 266)

The invention described herein may be manufactured and used by or for the Government of the United States of America for governmental purposes without the payment of any royalties thereon or therefor.

The present invention relates to projection systems and more particularly to a system for projecting a number of moving objects wherein the movement of the objects is not prerecorded on a medium such as film.

In the past, in order to project a number of objects moving independently of one another it was necessary either to prerecord such movements on a medium such as film or else to use a number of individual projectors, each projecting one of the targets on the projecting surface and then moving the projectors individually to obtain the necessary movement of the images.

The disadvantage of the use of prerecorded information is that in order to change the motion of the object a new film must be recorded. Therefore, in devices in which the response of a viewer to the scene is an integral part of the projection system, the use of prerecorded information would not be possible.

The objections to a system using a number of individual projectors lies chiefly in the requirements of such a system for power, space, heat dissipation and support. However, this system has further disadvantages in that the projection of the images does not come from a point source. Thus, it is impossible to shape the screen so as to prevent distortion of all the images.

Thus, it is an object of the instant invention to provide a multi-image projector for projecting independently maneuvering target shapes across the screen while not prerecording the motion of such targets.

Another object of the instant invention is to provide a projection system that does not have the electrical "power drain," the extensive space requirements, the heat dissipation problems, nor the complexity, distortion or weight of previous systems.

Other objects and many of the attendant advantages of this invention will be readily appreciated as the same becomes better understood by reference to the following detailed description when considered in connection with the accompanying drawings wherein:

FIG. 3 is a diagrammatic representation of another embodiment of the instant invention.

Figure 1:
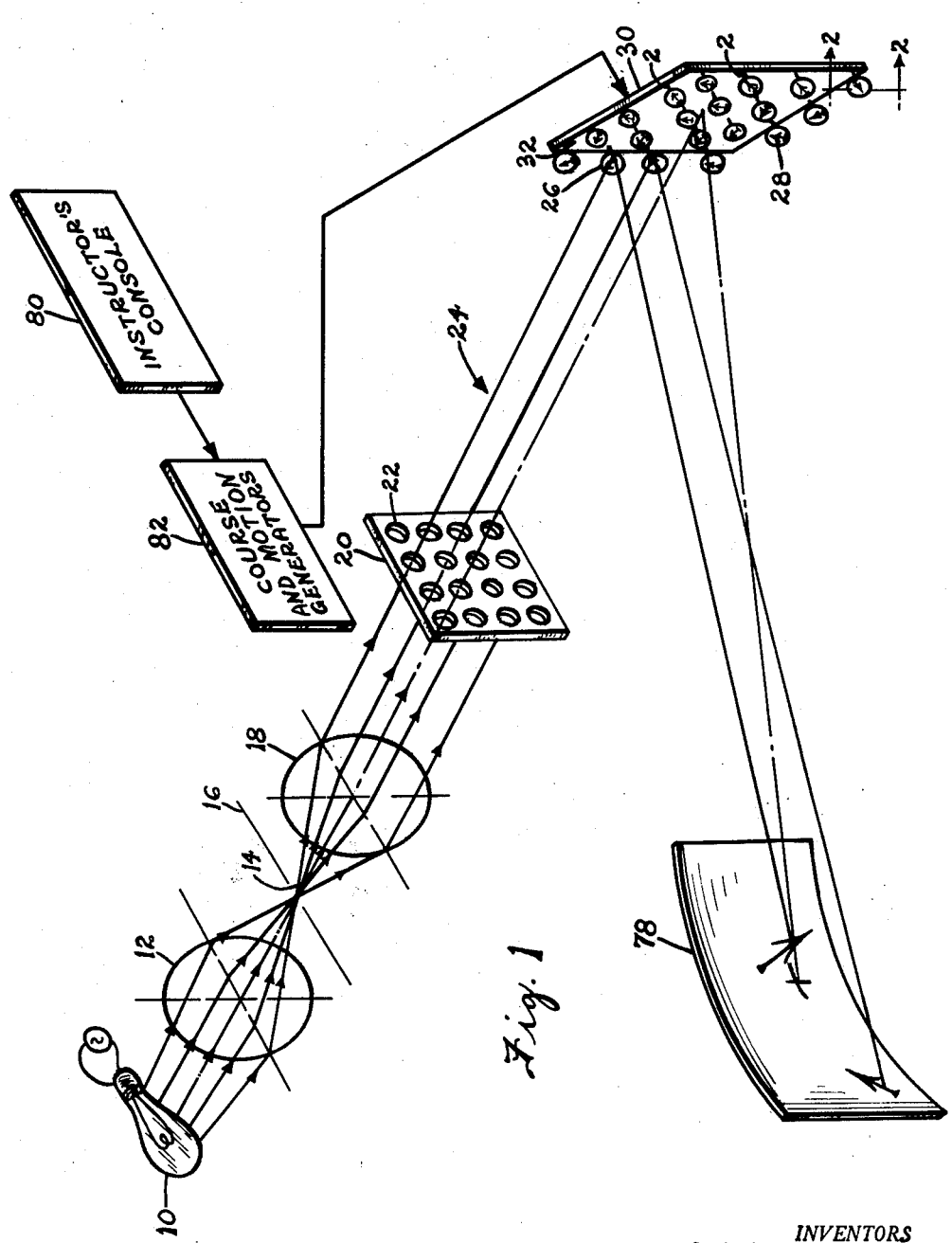
FIG. 1 is a diagrammatic representation of one embodiment of the instant invention.
Figure 2:
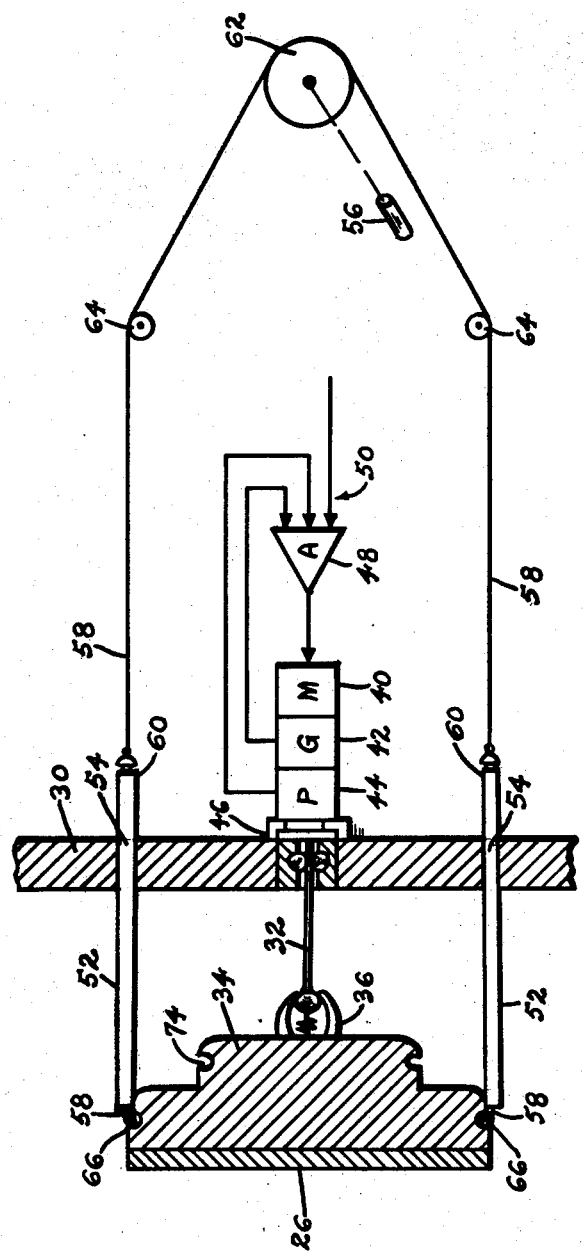
FIG. 2 is a section taken thru 2—2 of FIG. 1.

Referring now to FIGS. 1 and 2, a light source 10 casts its light on a condensing lens 12 which condenses the light into an aperture 14 in an opaque plate 16. A collimating lens 18 situated in front of the aperture 14 collimates the light into a multiple aperture plate 20 having numerous circular apertures 22 that produce a number of parallel beams of light 24. Aligned with each of the apertures 22 in the plate 20 is a disk with a reflective image 28 thereon to deflect and shape the light beams 29. These disks 26 are mounted on a mounting board 30 by shafts 32 connected to the base 34 of the disk 26 by means of a spring-loaded splined ball joint 36 which will permit nutating of the disk around the central shaft position while preventing any relative rotation between the disk and the shaft.

For rotating the disk 26 about an axis defined by the shaft 32 the end of the shaft is coupled thru a hole in the mounting board to a motor 40, generator 42 and potentiometer 44 set secured to the back of the mounting board 30 by means of a number of clamps 46. The outputs of potentiometer 44 and generator 42 of the set are fed into an amplifier 48 which then feeds them along with input signal 50 into the motor 40 to accurately rotate the disk 26 about the shaft 32 in response to the input signal 50.

To rotate the disk 26 about a horizontal axis parallel with its face pressure is brought to bear on the top or bottom of the disk by rods 52 sliding freely back and forth thru holes 54 in the mounting board 30. The rods 52 are actuated by a motor, generator, potentiometer set 56 similar to the one used to rotate the disk 26 about its axis 32 and is similarly driven by an amplifier being fed controlling inputs. Power is transmitted to the rods 52 from the servo 56 by a cable 58 attached at the ends 60 to the rods. The cable is wrapped around a drum 62, which is concentric with the servo shaft, to receive the servo's motion and over idlers 64 situated to keep it taut. The bearings 66 are attached to the ends of the rods 52 by swiveled clips which roll freely in an annular groove round the edge of the mirror so that when the disk 26 is rotated by the motor 40, the rods 52 retain their positions at the top and bottom of the mirror.

To tilt the mirror about a vertical axis parallel wih the mirror's face 26, a second motor, drum, cable set similar to the one positioning the mirror around a horizontal axis is provided. The rods of that set remain in a horizontal position because a second set of swivel balls in a second annular groove 74 allows the mirror to rotate without disturbing their position. Thus, by actuation of either the horizontal or vertical motor drum cable sets, the mirror may be tilted around either of the two mutually perpendicular axes parallel to the mirror's face.

On the face of each disk the reflective image 28 picks up the beam of light transmitted thru its respective aperture and projects it onto a curved screen 78. A control console 80 coupled to the mirror's controls thru course and motion generator 82 permits an operator to actuate the course and motion generator 82 so as to properly rotate the reflective images 76 or nutate the disks either individually or collectively so that the images on the screen 78 will change position and orientation.

In operation, light is cast by the light source 10, picked up and collimated by the condensing lens 12, aperture plate 16 and collimating lens 18 combination and is passed through a multi-aperture plate 20 which divides the light source into a number of individual parallel beams 24. Each of these beams is directed to a disk 26 having a reflector image 28 contained thereon. Light transmitted by this image appears on a curved screen 78 in the shape of the transmitting reflective image. An operator thru the instructor's console 80 can operate the proper course and motion generator 82 to vary the speed and direction in which the objects move across the screen by rotating the mirror to produce changes in heading and by nutating the mirror to produce the necessary motion.

Referring to FIG. 3, the illustrated orthogonal image projecting and reflection system is shown as having a light source 100 casting light on a condensing lens 102 which directs the light beams through a small aperture 104 in an opaque plate 106 onto a collimating lens 108 that collimates the light and directs it to a multi-aperture plate 110. The multi-aperture plate contains a number of openings into which are inserted the reticles 112 having appropriate images 114 thereon. The reticles are mounted rotatably within a solenoid operated stepping switch 116 which rotates the image in steps when actuated by inserting a pulse into the correct row 118 and grounding the proper column 120 in the accompanying matrix.

The images produced at the aperture plate 110 are passed thru a projection lens system 122 to provide the adequate depth of field and to project each of the images produced on a particular mirror 128 in the bank of positioning mirrors. The images reflected from the mirror appear on a screen 130 curved to limit the error of projection to a minimum.

A control console 132 is provided to permit an operator to adjust the images thru course and motion generators 134. The course and motion generators provide stepping voltages to actuate the solenoids 116 in which the image transparencies are mounted thus rotating the transparencies so as to change the aspect of the image on the screen. The direction of rotation of the transparencies depends on the phase of the signals put into the solenoid. Further, the course and motion generators provide activating signals for nutating the mirrors. The control mechanisms for nutating the mirrors are similar to the ones described with respect to FIG. 1 to perform the same function.

In operation, therefore, a collimated source of light is produced by a light source 100, condensing lens 102, aperture 104 and collimating lens 108 combination and is projected upon an opaque plate 110 with a number of apertures therein. Transparencies 114 inserted in each of the apertures produce images at each aperture. A lens system 122 which provides adequate depth of field directs the images onto a bank of mirrors 128 located in front of a curved screen 130, each mirror 128 reflecting one of the images. An operation by manipulation of a control console 132 feeds step voltages into the solenoids 116 to cause them to rotate the image on the screen 130 and applies signals to the micro controls to provide for imparting motion to each of the images.

Obviously many modifications and variations of the present invention are possible in the light of the above teachings. It is therefore to be understood that within the scope of the appended claims the invention may be practiced otherwise than as specifically described.

What is claimed is:

1. A device for producing an array of moving target images on a screen where each of the individual images in the array may be varied in motion and orientation to show to an observer any number of patterns of relative motion between the target images comprising; a light source producing a beam of light, an opaque plate with apertures therein optically aligned with said light source so as to split said light beam into a multiplicity of parallel beams, reflective image means optically aligned with each of said parallel beams so as to reflect said parallel beams in the form of target images on a screen and means coupled to said reflective image means for rotating and nutating said reflective image means to move and reorient the images on the screen.

2. The structure of claim 1 wherein said reflective image means each is pivotally mounted on a shaft rotatably mounted on a supporting board.

3. A device for producing an array of moving targets on a screen where each of the individual images in the array may be varied in motion and orientation to show to an observer any number of patterns of relative motion between the target images comprising; a light source producing a beam of light, an opaque plate with apertures therein optically aligned with said light source to split said light source into a multiplicity of aparallel beams, image means rotatably mounted on said apertures to produce a number of target images on a screen and reflective means optically aligned with said images to move said images on the screen.

4. The structure of claim 3 wherein said reflective means each is a mirror mounted pivotally on a shaft which is rotatable in a supporting board.

5. The structure of claim 3 wherein said screen is curved to eliminate distortion.

References Cited in the file of this patent

UNITED STATES PATENTS

| | | |
|---|---|---|
| 1,750,785 | Randall et al. | Mar. 18, 1930 |
| 1,792,046 | Skaupy | Feb. 10, 1931 |
| 2,410,550 | Padva | Nov. 5, 1946 |
| 2,614,363 | Bowditch | Oct. 21, 1952 |
| 2,680,620 | Dale | June 8, 1954 |
| 2,821,393 | Hoppe | Jan. 28, 1958 |
| 2,887,927 | Newton | May 26, 1959 |
| 2,960,906 | Fogel | Nov. 22, 1960 |
| 2,987,962 | Helka | June 13, 1961 |
| 3,016,791 | Van Inwagen | Jan. 16, 1962 |